(12) United States Patent
Kalai et al.

(10) Patent No.: US 9,082,086 B2
(45) Date of Patent: Jul. 14, 2015

(54) ADAPTIVELY LEARNING A SIMILARITY MODEL

(75) Inventors: Adam T. Kalai, Cambridge, MA (US); Omer Tamuz, Jerusalem (IL); Ce Liu, Arlington, MA (US); Ohad Shamir, Cambridge, MA (US); Serge J. Belongie, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 13/113,018

(22) Filed: May 20, 2011

(65) Prior Publication Data

US 2012/0296900 A1 Nov. 22, 2012

(51) Int. Cl.
*G06Q 10/00* (2012.01)
*G06F 17/30* (2006.01)

(52) U.S. Cl.
CPC .......... *G06Q 10/00* (2013.01); *G06F 17/30867* (2013.01)

(58) Field of Classification Search
CPC .......................... G06Q 10/00; G06F 17/30867
USPC ........................................................ 707/737
See application file for complete search history.

(56) References Cited

U.S. PATENT DOCUMENTS

| | | | |
|---|---|---|---|
| 6,748,398 B2 | 6/2004 | Zhang | |
| 6,865,302 B2 | 3/2005 | Chang | |
| 7,272,593 B1 | 9/2007 | Castelli | |
| 7,499,916 B2 | 3/2009 | Liu | |
| 7,567,960 B2 | 7/2009 | Wei | |
| 7,634,471 B2 | 12/2009 | Chen | |
| 8,285,052 B1 * | 10/2012 | Bhattacharyya et al. | 382/190 |
| 8,391,618 B1 * | 3/2013 | Chuang et al. | 382/224 |
| 2008/0010258 A1 * | 1/2008 | Sureka | 707/3 |
| 2008/0262964 A1 * | 10/2008 | Bezos et al. | 705/39 |
| 2009/0034805 A1 | 2/2009 | Perlmutter | |
| 2010/0077301 A1 | 3/2010 | Bodnick | |
| 2012/0323825 A1 * | 12/2012 | Chen et al. | 706/12 |

OTHER PUBLICATIONS

The bayesian image retrieval system, pichunter: theory, implementation and psychophysical experiments-Published Date: Jan. 2000 http://pnylab.com/pny/papers/phj/phj/index.html.
Relevance feedback: a power tool for interactive content based image retrieval-Published Date: Sep. 1998 http://www.tele.ucl.ac.be/~devlees/ref_ELEC2885/Lect8_CBIR/relevance_feedbackCSVT98.pdf.
Interactive learning using a "society of models" —Published Date: Jun. 1996 http://hd.media.mit.edu/tech-reports/TR-349.pdf.

(Continued)

*Primary Examiner* — Alexey Shmatov
(74) *Attorney, Agent, or Firm* — Sandy Swain; Judy Yee; Micky Minhas

(57) ABSTRACT

A method, system, and computer-readable storage medium for computing a representation of similarity among items in a set of items. Computing a representation of similarity items may comprise generating a first similarity model that represents characteristics of the set of items, the characteristics being indicative of similarity among the items in the set of items. Additionally, computing the representation of similarity may comprise adaptively selecting a subset of the set of items for similarity evaluation based on the first similarity model, receiving a similarity evaluation for the adaptively-selected subset of items, and generating a second similarity model based on the first to similarity model and the received similarity evaluation.

20 Claims, 10 Drawing Sheets

(56) References Cited

OTHER PUBLICATIONS

Agarwal, S. et al, "Generalized Non-metric Multidimensional Scaling" AISTATS, San Juan, Puerto Rico, 2007. (8 pages).

Schultz, M. et al. "Learing a Distance Metric from Relative Comparisons" Advances in Neural Information Processing Systems (NIPS). MIT Press, 2003. (8 pages).

Settles, B. "Active Learning Literature Survey" Computer Sciences Technical Report 1648, University of Wisconsin-Madison, Updated on Jan. 9, 2009 (46 pages).

Srebro, N. et al. "Rank, Trace-Norm and Max-Norm" COLT, vol. 3559 of Lecture Notes in Computer Science, pp. 545{560. Springer, 2005. ISBN 3-540-26556-2. (15 pages).

Xing, E. et al. "Distance metric learning, with application to clustering with side-information" University of California, Berkeley Advances in Neural Information Processing Systems 15, pp. 505-512. MIT Press, 2003.

Beygelzimer, A. et al. "Importance Weighted Active Learning" Proceedings of the 26$^{th}$ International Conference on Machine Learning, Montreal, Canada, 2009 (8 pages).

Indyk, P. et al. "Low-Distortion Embeddings of Finite Metric Spaces" Low-Distortion Embeddings of Finite Metric Spaces. CRC Press, 2004. (20 pages).

Joachims, T. "Making Large-Scale SVM Learning Practical", Jun. 15, 1998 (17 pages).

Lee, J. et al. "Practical Large-Scale Optimization for Max-Norm Regularization" Advances in Neural Information Processing Systems 23, pp. 1297-1305. 2010 (9 pages).

McFee, B. et al. "Heterogeneous Embedding for Subjective Artist Similarity" Tenth International Symposium for Music Information Re-trieval (ISMIR2009)), Oct. 2009 (6 pages).

\* cited by examiner

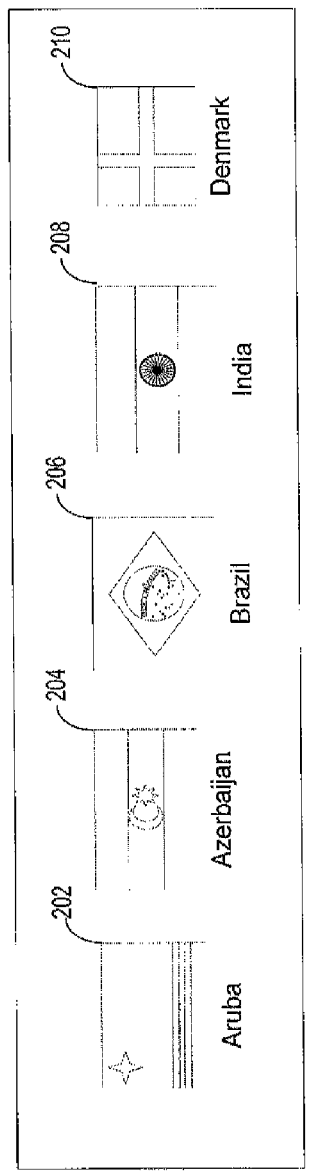
FIG. 2a
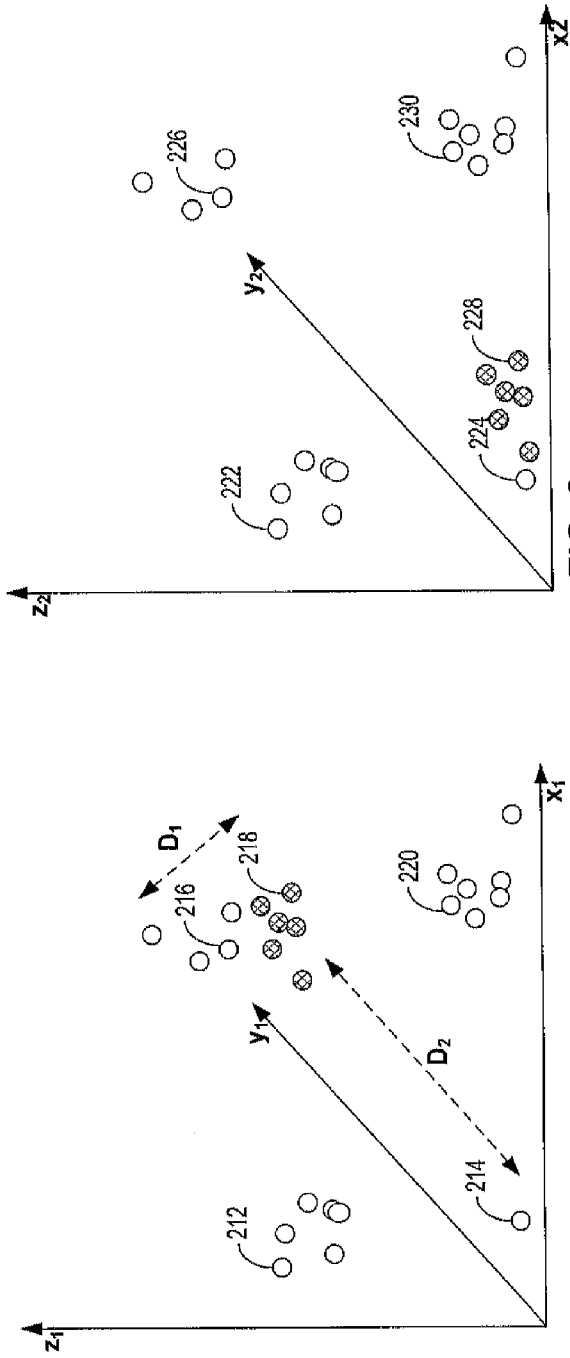
FIG. 2b
FIG. 2c

ADAPTIVELY LEARNING A SIMILARITY MODEL

BACKGROUND

Techniques for capturing similarity among items have been applied in many areas ranging from computer vision and image processing to audio signal processing and information retrieval. Such techniques have been used for various applications including exploratory data analysis, interactive search, clustering, collaborative filtering and classification.

Conventional techniques for capturing similarity among items rely on constructing a mathematical model to quantitatively represent characteristics of the set of items that are indicative of a degree of similarity among the items. For example, many approaches involve constructing an N by N similarity matrix, sometimes termed a similarity kernel, over all pairs of N items. The entry stored in row m and column n of the similarity matrix represents a quantitative measure of similarity between item m and item n, and represents characteristics of the corresponding items.

SUMMARY

A similarity model to represent similarity among a set of items so as to reflect a human notion of similarity, may be constructed based on human-performed similarity evaluations of adaptively-chosen items. Multiple users may be asked to judge similarity among items. The items about which users are asked to provide input may be adaptively-selected based on previously-received responses. For example, an iterative process may be used where, in each iteration, a set of items may be selected based on usefulness of information provided from a similarity rating about items in the set. A similarity rating may be obtained based on input from one or more users. Because of time and cost of acquiring user input, reducing the amount of user input used to construct a similarity model may be important for constructing the similarity model in a cost-effective way. The representation obtained after the last iteration may be applied to a broad range of problems including interactive search, clustering, and classification.

Accordingly, in some embodiments a method may be provided for computing a representation of similarity among items in a set of items. The method may comprise generating a first similarity model that represents characteristics of the set of items, the characteristics being indicative of similarity among the items in the set of items. A subset of items may be adaptively selected for similarity evaluation, with a processor, based at least in part on the first similarity model. A similarity evaluation for the adaptively-selected subset of items may be received, and a second similarity model may be generated based on the first similarity model and the received similarity evaluation.

In some embodiments, a system may be provided for computing similarities between images in a set of images. The system may comprise at least one processor programmed to perform a method comprising receiving a first set of similarity evaluations. Each similarity evaluation may be an evaluation of a subset of the set of images. The method may include adaptively selecting an additional subset of the set of images for similarity evaluation based on the first set of similarity evaluations and an information-theoretic criterion, receiving an additional similarity evaluation for the additional subset, and, with a processor, generating a similarity model based on the first set of similarity evaluations and the additional similarity evaluation.

In some embodiments, a computer-readable storage medium may be provided. The computer-readable storage medium may be encoded with processor-executable instructions that, when executed by a processor, cause the processor to perform a method for computing similarities among items in a set of items, wherein each of the items in the set may be represented quantitatively by coordinates in a first set of coordinates. The method may comprise selecting a subset of the set of items for similarity evaluation based on the first set of coordinates, receiving a similarity evaluation for the selected subset of items, and computing a second set of coordinates based on the first set of coordinates and the received similarity evaluation, wherein each of items in the set may be represented quantitatively by a coordinate in the second set of coordinates.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2a shows an illustrative set of images for which a representation of similarity may be obtained, in accordance with some embodiments of the present disclosure.

FIGS. 2b and 2c illustrate, graphically, two examples of similarity models of a set of images comprising the illustrative images shown in FIG. 2a, in accordance with some embodiments of the present disclosure.

DETAILED DESCRIPTION

Figure 1:
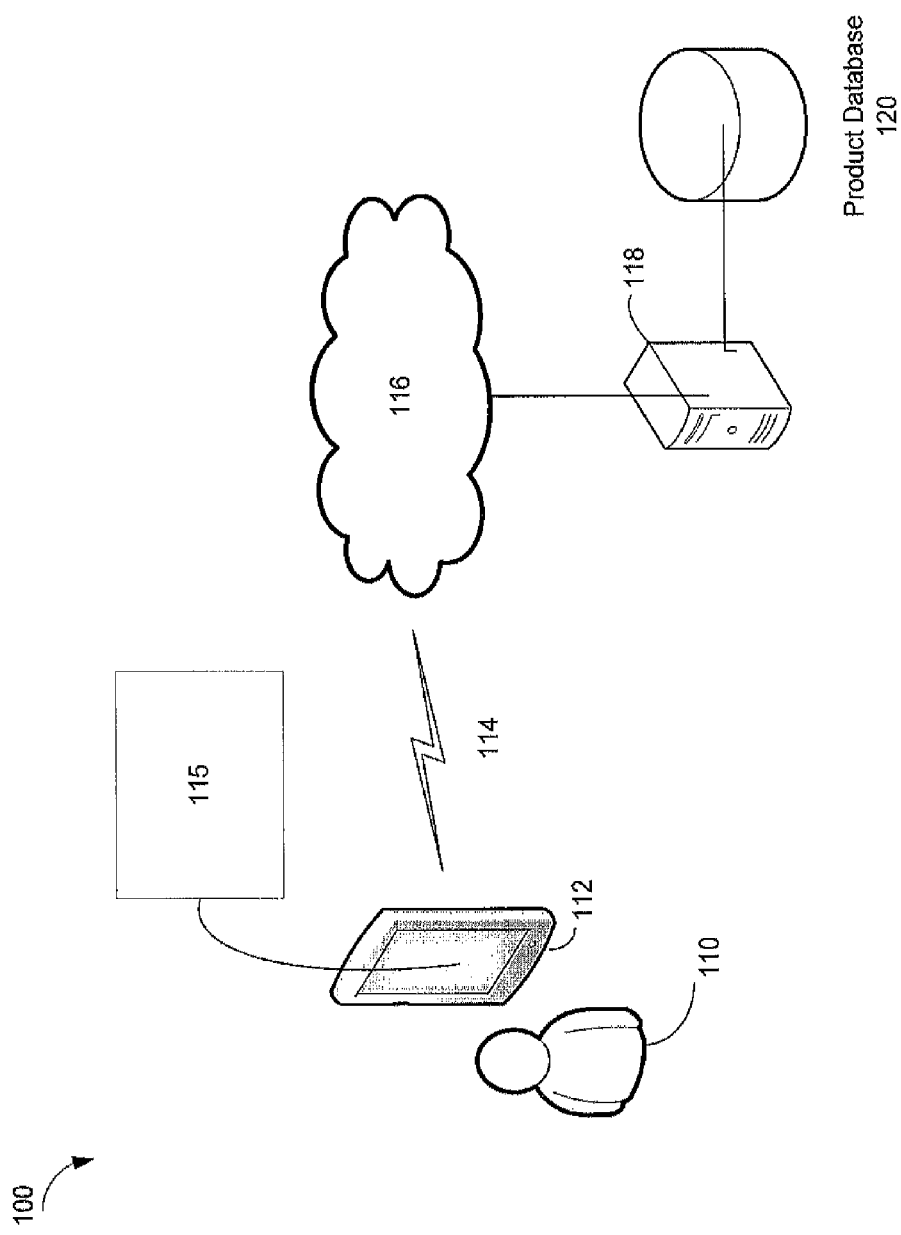
FIG. 1 shows an exemplary system for browsing and selecting items using a similarity model, in accordance with some embodiments of the present disclosure.

The inventors have recognized that a representation of similarity among items may be constructed to reflect a human notion of similarity among these items. Such a representation may be constructed based at least in part on human evaluations of similarity of the items. The inventors have also appreciated that such a representation may be used in a variety of systems that involve user interaction. A system relying on such a representation may be more likely to behave in accordance with a user's expectations. For example, a representation of similarity may be used as part of an interactive search system. In this case, a representation of similarity may allow the user to quickly locate the item he is looking for.

The inventors have recognized and appreciated that conventional approaches to capturing similarity among items are expensive and time-consuming to implement. Many conventional approaches rely on a representation of each item by a group of informative features. For instance, a similarity matrix may be constructed by comparing groups of features corresponding to pairs of items. However, informative features that are indicative of a degree of similarity among items may take time and effort to find, implement, and tune. For instance, a specialized effort may be needed to identify features of a couch image that are indicative of whether the couch looks comfortable. As another example, extensive effort may be required to identify features of a shoe image indicative of whether the shoe can be worn to an informal occasion. Depending on the nature of the items (e.g., images of couches) domain expertise (e.g., in image processing and/or furniture) may be required to identify such features.

The inventors have further recognized that features conventionally used to obtain an indication of a degree of similarity among items may not reflect a human notion of similarity among these items, which is important in a variety of applications. To address this issue, some conventional techniques rely on user input to evaluate how similar such features will appear to people. The inventors have appreciated that such approaches require users to evaluate similarity of each pair of items, and that, since multiple evaluations for each pair of items by multiple humans may be required, this approach is extremely time-consuming and may be prohibitively expensive for even a modest number of items.

The inventors have recognized and appreciated that building a similarity model, to represent similarity among items in a set of items, based on adaptively-chosen similarity evaluations performed by humans may overcome some of the above-mentioned shortcomings of conventional techniques for capturing similarity. However, not every embodiment addresses every one of these drawbacks, and some embodiments may not address any of them. As such, it should be appreciated that the invention is not limited to addressing all or any of the above-discussed drawbacks of these conventional techniques.

Using human evaluations may allow the obtained similarity model to reflect a human notion of similarity and may avoid the time-consuming and expensive task of developing domain-specific features for every task for which (or a domain in which) such a model may be useful. The inventors have appreciated that because a similarity model that reflects a human perception of similarity does not require any domain expertise to construct, systems using such models may be applied to a wide range of tasks and may be readily deployed in new domains.

Items about which users may be asked to provide input may be selected adaptively based on previously-received responses. For example, an iterative process may be used where, in each iteration, data is acquired about the similarity of items in a set of items from one or more users. This set of items may be selected based on the usefulness expected from a subsequent selection from the set of items. Accordingly, the set of items may be selected based on a measure of expected utility and, in particular, may be selected as a set that optimizes expected utility. This approach may reduce the overall number of evaluations used to determine similarity among items, thereby reducing the cost of using human evaluators and building the similarity model.

The inventors have further recognized that similarity models may be applied to the problem of interactive search because using a similarity model as part of an interactive search system may allow a user of the system to rapidly find and select the item (e.g., a product) for which the user is searching. The similarity model may be used to select subsets of items to present to the user and may be used in different phases of a search session. In one phase, the similarity model may be used to quickly learn characteristics of items sought by the user. In this phase, subsets of items may be selected based on the amount of information gain expected from a subsequent selection from each such subset. In a subsequent phase, the learned characteristics of the item may be used to select a further subset of items having characteristics similar to the learned characteristics, desired by the user, for a final user selection. The inventors have appreciated that a similarity model that reflects a human notion of similarity is particularly well suited to such a task.

FIG. 1 shows an illustrative system 100 in which a similarity model may be applied. System 100 may be a for information search. In this example, system 100 is configured for receiving orders from a user. Such a system may be used as part of a product ordering system. System 100 may allow user 110 to interactively search for items to order in an online store. User 110 may have a product in mind, such as a necktie with a certain pattern, perhaps to match a shirt that the user already owns. The online store may sell this exact product and/or may sell products similar to the product desired by the user. To browse neckties offered for sale by the online store, user 100 may use application 115 executing on mobile device 112 to connect to online store server 118, which may be operated by the online store or on behalf of the online store.

Application 115 may be implemented using technology as known in the art. In some embodiments, application 115 may be a browser. Though, the user is not limited to using a mobile device and may use any interface capable of allowing the user to browse products offered by the online store. For example, the user may use a desktop computer or a tablet computer.

Online store server 118 also may be implemented using known technology. However, store server 118 may be configured to use a similarity model as described herein.

In the illustrated embodiment, mobile device 112 is connected wirelessly to network 116 through a channel 114 and may communicate through network 116 with the online store server 118. Network 116 may comprise, for example, the Internet, a LAN, a WAN and/or any other wired or wireless network, or combination thereof. Online store server 118 and mobile device 112 may communicate through any suitable networking protocol (e.g., TCP/IP) because the manner in which information is transferred between online store server 118 and mobile device 112 is not a limitation of the present invention.

Online store server 118 may be configured to send product information (e.g., pictures of neckties for sale) to mobile device 112 over network 116. Online store server 118 may obtain product information from product database 120 to which online store server 118 may be connected. Server 118 may be connected to product database 120 via a wired connection (as shown) or using any other means, as embodiments of the invention are not limited in this respect.

Product database 120 may store product information. Product information may comprise product characteristics and/or information of interest to a customer of the online store. For instance, product information may comprise images of products, product features, product prices, shipping information, and customer reviews. Though, in other embodiments server 118 may store the product information and no separate product database may be necessary.

Mobile device 112 may receive product information from online store server 118 and display the received information to user 110 by using application 115. For instance, the user may provide input through application 115 to request product information. The request may be in any suitable format. The user may request, for example, information about a type of product. For instance, the user may search the website of the online store hosted on server 118 for "neckties." Additionally or alternatively, the request may specify one or more characteristics of products of interest. For instance, the user may request information about blue neckties.

In response to the user request for product information, server 118 may send an initial set of products and send the corresponding images to mobile device 112. For example, server 118 may send pictures of solid and striped ties. In one embodiment, the initial set of products may be selected based on a similarity model. Though, in other cases an initial set of products may be selected in any suitable way. For example, the initial set of neckties may be chosen based on a characteristic of each tie. User 110 may view the received product images (e.g., images of neckties) via application 115.

Upon seeing the displayed neckties, which may include striped, solid, and dotted ties, the user may decide that one of the striped ties displayed via application 115 is more similar to the tie that the user had in mind than the other ties displayed. Accordingly, user 110 may wish to look at other ties similar to that striped tie. The user may then indicate, via application 115, that he wishes to look at neckties similar to the striped tie. This response may be forwarded to server 118, which may return a second set of neckties, in response to the request. The second set of ties may be selected based on information gain from a subsequent selection, by user 100, of a tie in the second set of ties. The user may find a second tie in the second set of ties that may be even closer to the tie that the user had in mind and select that tie. This process may iterate until the user finds the tie he was looking for or a tie similar enough to the tie he was looking for. Then the user may buy the tie, save the tie in a shopping cart, e-mail himself a link to the webpage with the tie, etc.

In the above-described system, server 118 is configured to find a set of ties similar to a tie previously selected by user 110 and send corresponding product information to user 110. Server 118 may find a set of ties similar to a tie selected by a user in any suitable way. In some embodiments, server 118 may use a similarity model that represents similarity of the set ties sold by the online store. In particular, server 118 may use the similarity model together with the tie selected by user 110 to identify the tie that the user may be looking for. Accordingly, server 118 may identify a set of ties such that a subsequent user selection from this set would provide information about the tie that the user may be interested in Construction of similarity models and their use for interactive search is described in greater detail below.

It should be recognized that system 100 is an illustrative system and various aspects of system 100 may be implemented differently. For example, though system 100 was described with respect to an online store selling ties, the system may be implemented for any suitable item or any suitable product such as any product that may be sold online.

User 110 may not be at a remote location accessing website of a store, but could be in a store using a local workstation to browse for products in lieu of walking around the store. In addition, system 100 may be adapted to support interactive search not only among images (in the above example, ties were represented by images), but also other forms of data such as audio waveforms (e.g., when searching for a song a user may be thinking of) or text (e.g., looking for book on a subject that a user may be thinking of).

A similarity model may represent characteristics of a set of items such that the represented characteristics are indicative of a degree of similarity among the items. In some embodiments, the similarity model may represent characteristics of a set of items by representing characteristics associated with each item in the set of items. For example, the model may contain values for each of a plurality of characteristics of an item. These values for an item may be regarded as coordinates for the item in a similarity space characterizing items such that a value representing similarity of two items may be obtained by determining distance between the coordinates of the items in the similarity space. The distance may be measured using any suitable distance function as is known in the art. In other embodiments, the model may capture values representing differences between items in one or more dimensions.

In some embodiments, each dimension of the coordinates may correspond to a human-perceptible feature or a feature meaningful to a human user. For example, a characteristic of an item may be the color of the item (color may be a meaningful feature to a user) and this may be represented by using three features (dimensions): red, blue, and green. Accordingly, coordinates of each specific color may be specified by the values of each of the three features. However, in some embodiments, the dimensions of the coordinates may correspond to features that may have no recognized significance to a human.

In some embodiments, a similarity model may represent characteristics associated with more than one item in the set of items. For example, the model may store a measure of similarity for every pair of items (e.g., a similarity matrix) or may store a measure of similarity for subsets of items (e.g., clusters). In some embodiments, a similarity model may store characteristics associated with individual items and/or with groups of items.

FIGS. 2a, 2b, 2c, and 3 conceptually illustrate exemplary similarity models that represent characteristics associated with each item in a set of items. FIGS. 2a-2c, illustrate building a similarity model for a set of images, each of which depicts a flag of a different country. FIG. 2a shows five images from this set—flags 202 (Aruba), 204 (Azerbaijan), 206 (Brazil), (208) India, and 210 (Denmark). Note that FIG. 2a shows only five flags for clarity and that the set of images may comprise any suitable number of images and may contain tens, hundreds, thousands, and/or millions of images. Also, the items are shown as black and white images. However, the invention is not so limited. Techniques as described herein may be applied to constructing and using similarity models for any suitable number of items of any suitable type.

Various features derived from images shown in FIG. 2a may be used to indicate similarity among the shown images. For instance, flags 204 (Azerbaijan) and 208 (India) both have two horizontal lines splitting the flag into thirds, with the middle third comprising a centered image. These shared features may indicate a degree of similarity. Another example is that flag 206 (Brazil) and flag 208 (India) both contain circular shapes, which are features that may be indicative of similarity. Though many other features indicative of similarity may be derived from these images.

A similarity model may represent characteristics associated with each item in a set of items, quantitatively, by a vector of coordinates such that each dimension of the vector corresponds to a feature. The value in each dimension (a feature value) may represent a degree to which an item contains that feature. The features used within a similarity model may be identified automatically, manually, or by some combination of automatic and manual techniques. Automatic identification of features may reduce the cost of manually identifying informative features in each domain in which a similarity model may be used. Indeed, features indicative of similarity among items in one domain (e.g., images of flags) may be partially or entirely different from features indicative of similarity among items in a different domain (e.g., images of sign language signs).

The number of features associated with each item and, consequently, the number of dimensions of the vector may be any suitable number. In some embodiments, the number of features may be smaller than the number of raw data points used to represent each item. For instance, each flag image in FIG. 2a may be a 256 by 256 grid of pixels and therefore comprise $2^{16}$ pixels. However, a three-dimensional vector of features may be derived from each image. Generally, if an item is represented by N numbers (e.g., $2^{16}$), a smaller number of features d (e.g., d=4) may be derived from these N numbers. Using a small number of features reduces the computational complexity of working with a similarity model (e.g., estimating the model and querying the model). Though, the number of features may be any suitable number smaller than or equal to N and in some cases (e.g., kernel machines such as support vector machines) may be larger than N, as the invention is not limited in this respect.

A vector of d feature values associated with an item may define coordinates of the item in a feature space used to characterize items. Distance between items as represented by their coordinates in the feature space may be an indication of similarity of the items. Accordingly, a similarity model may represent a set of items by a set of coordinates (i.e., each item has coordinates) in d-dimensional Euclidean space. When the number of dimensions is small (e.g., 2 or 3), the set of coordinates may be visualized as shown in the examples of FIGS. 2b and 2c, which illustrate two similarity models that represent images of flags, including the images shown in FIG. 2a.

The similarity model graphically illustrated in FIG. 2b represents images of flags using a set of three-dimensional coordinates. Coordinates associated with each image are indicated by a small circle in the three-dimensional plot shown in FIG. 2b. The vectors associated with flags 202, 204, 206, 208, and 210 are indicated as circles 212, 214, 216, 218, and 220, respectively. The set of coordinates resulting from associating each item in a set of items with coordinates (e.g., as in FIG. 2b) is termed "an embedding" because each of the items is assigned a location in (i.e., embedded into) space.

Though in the example of FIG. 2b, the embedding is a three-dimensional embedding, the embedding may be a d-dimensional embedding for any suitable number of dimensions d. The number of coordinates (i.e., the number of features) associated with an image of a flag (or more generally any item) is equal to three in the examples of FIGS. 2b and 2c for purposes of visualization. However, the invention is not limited in this respect, and a similarity model may represent each item using d numbers, where d may be any suitable positive integer (e.g., 2, 3, 4, 5, 10, 25 and etc.). In this case, each item in the set may be associated with a d-dimensional vector.

FIG. 2c shows an alternative embedding of the set of images of flags into a three-dimensional space using a different set of three features. The vectors associated with flags 202, 204, 206, 208, and 210 are indicated with 222, 224, 226, 228, and 230, respectively. Note that the items indicated by shaded circles have different coordinates in FIG. 2c than they did in FIG. 2b.

In the examples of FIGS. 2b and 2c, determining separation between items within the embedding of the items may provide one indication of similarity. For instance, as shown in FIG. 2b, the distance $D_2$ between flag 214 and flag 218 is larger than the distance $D_1$ between flag 216 and flag 218. This may be an indication that flags 216 and 218 are more similar than flags 214 and 218. As another example, flags 212, 214 and 220 appear to be in different clusters, whereas flags 206 and 208 appear to be in the same cluster, which may be indicative of their similarity. Though, there are many other ways in which a set of coordinates may be used to indicate a degree of similarity between items. For instance, any function (e.g., inner product, distance, and norm) between a set of coordinates associated to one item and a set of coordinates associated to another item may be used to indicate similarity between these items.

Figure 3:
FIG. 3 shows an illustrative data structure for storing a similarity model, in accordance with some embodiments of the present disclosure.

Another way to represent a similarity model is shown in FIG. 3. In this example, a similarity model may represent a set of N items as a matrix 300 with N rows and d columns Each row of matrix 300 contains the coordinates of an item. For instance, the first three coordinates of item 1 are 1, 2, and −1; while the d'th coordinate of item 1 is equal to 3. Though, the set of coordinates need not be organized as a matrix and may be organized using any suitable data structure. The set of coordinates shown in matrix 300 may be stored in computer memory (e.g., memory of server 118).

Figure 4:
FIG. 4 shows an illustrative similarity model, represented as a similarity matrix, in accordance with some embodiments of the present disclosure.

Alternatively or additionally, a similarity model may represent characteristics simultaneously associated with more than one item in a set of items. For example, the model may store a measure of similarity for every pair of items. As shown in FIG. 4, this information may be organized in matrix 400. An entry in row m and column n of matrix 400 may represent a measure of similarity between item m and item n. Matrix 400 may be a positive semi-definite matrix.

Matrix 400 may be derived in any suitable way. For instance, it may be obtained by pairwise correlating items and/or representations of items in a feature space to determine similarity. Additionally or alternatively, the matrix 400 may be obtained from the similarity representation illustrated in FIG. 3. For example, denoting matrix 300 by M and similarity matrix 400 by K, the representations may be related according to $MM^T=K$. In other words, given an embedding that represents a set of items (e.g., images) with a set of coordinates, the similarity between any two items may be computed as an inner product of their corresponding coordinates. Conversely, a given N by N similarity matrix K may be factored into a product of a low-rank matrix (e.g., an N by d matrix M) with its transpose. The obtained matrix may be viewed as an embedding of the items in d-dimensional space. Though, it should be recognized that the above-described representations need not be obtained one from the other and may be obtained independently of one another in such a way that the relationship $MM^T=K$ may not hold.

Regardless of the manner in which a similarity model represents characteristics of a set of items (e.g., via a set of coordinates, a similarity matrix, or another representation), such a similarity model may be constructed from evaluations of similarity of subsets of the items.

Evaluations of similarity provide an indication of similarity between two or more items. A similarity evaluation could be expressed in any suitable way. In some embodiments, a similarity evaluation of a subset may comprise obtaining an indication, for a designated item in a subset, of which of the other items in the subset is most similar to the designated item. Suppose, for example, a subset of size three (a triplet) contains items A, B, and C. A similarity evaluation of such a triplet may comprise evaluating whether item A is more similar to item B than to item C. Such an evaluation may be indicated with a 0, corresponding to the case that A is more similar to B than to C, or a 1, corresponding to the case that A is more similar to B than to C. Each such evaluation may be represented as (A,B,C,0) or (A,B,C,1). When multiple such evaluations are performed, each may be indexed by a subscript indicating the order in which the particular similarity evaluation was obtained. Thus T evaluations, where T is any suitable positive integer such as 5, 10, 100 etc., may be represented as: $\{(A_1,B_1,C_1,Y_1), (A_2,B_2,C_2,Y_2), (A_3,B_3,C_3,Y_3), \ldots, (A_t,B_t,C_t,Y_t) \ldots, (A_T,B_T,C_T,Y_T)\}$. When each subset contains d features, each such evaluation may be stored as $(A^1, A^2, A^d, Y)$ where $A^1$ is a designated item and Y may be any integer between two and d, inclusive.

In other embodiments, instead of identifying an item most similar to a designated item, each item other than the designated item may be assigned a score for how similar it is to the designated item. As another example, an evaluation may comprise finding the two most similar items in a subset, such that no item has to be identified as a designated item. In some embodiments, a subset may consist of two items. In this case, a similarity evaluation may comprise obtaining a quantitative measure of how similar the first item is to the second item in the subset. Many other variations will be apparent to those skilled in the art.

Regardless of the type of similarity evaluation used to construct a similarity model, each such evaluation may be obtained from a human evaluator or automatically by a computer programmed to perform a computation that evaluates a degree of similarity. For instance, a human may examine three images and determine that image A is more similar to image B than to image C. Each such human-performed evaluation may reflect a human notion of similarity of items in a domain and, consequently, so may a similarity model generated on the basis of such evaluations. Alternatively, similarity evaluations may be performed automatically. For instance, values for each feature in a set of features may be automatically derived for each item and a function of the corresponding feature values may be used to evaluate similarity. As one example, each of a subset of items may be automatically assigned coordinates and the item closest in distance to a designated item (e.g., as computed by a distance function with respect to the corresponding coordinates) may be automatically selected as the most similar item to the designated item.

Accordingly, a similarity model may be constructed from human evaluations of subsets of items, automatic evaluations of subsets of items, or a combination of human and automatic evaluations. Though, it should be recognized that there are alternative ways to building similarity models. For instance, instead of obtaining similarity evaluations of multiple subsets, a similarity model may be obtained by automatically extracting features for each item in a set and measuring similarity between two items as a function (e.g., a distance) between the associated feature values. In this approach, similarity among subsets may not be considered.

Figure 5:
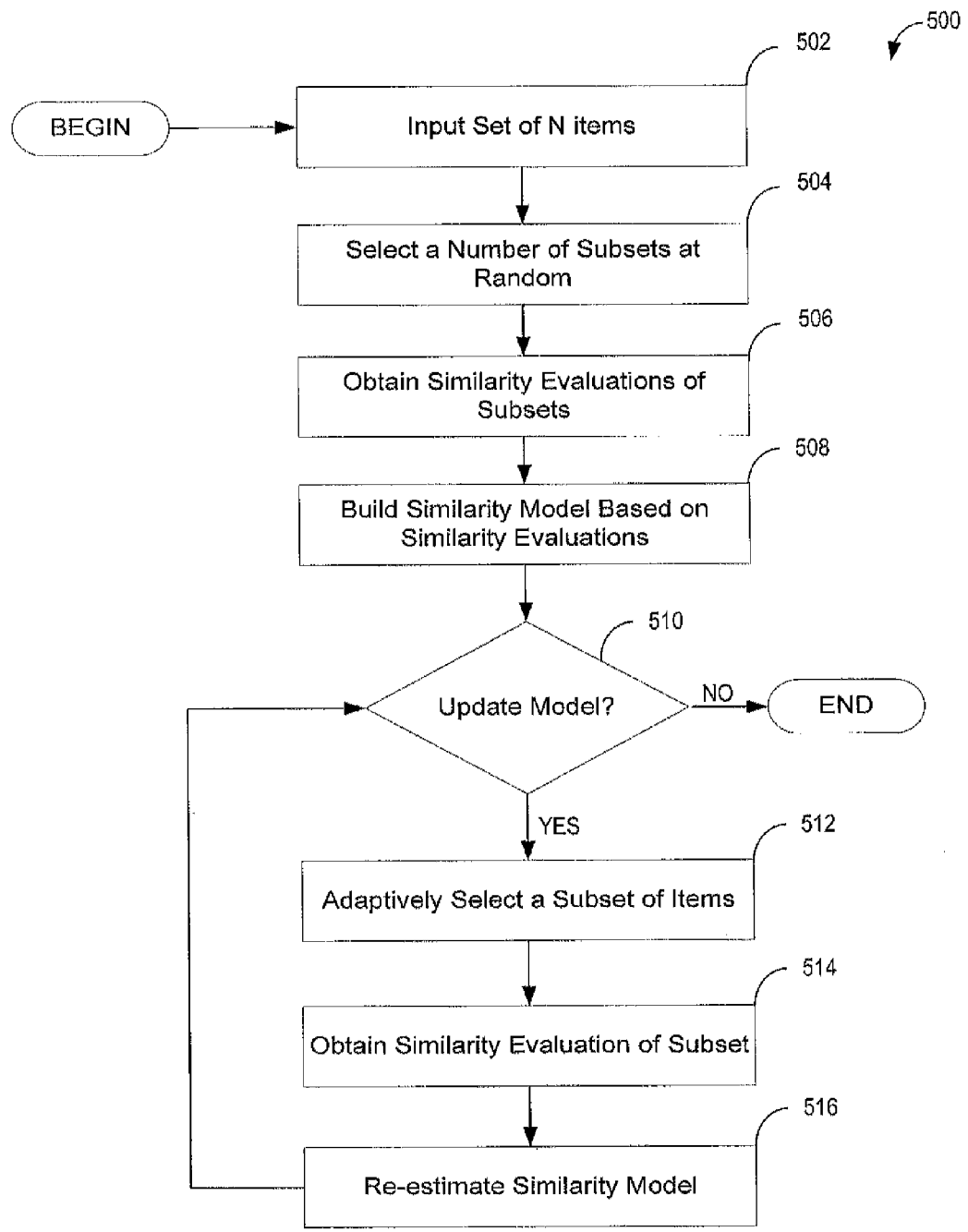
FIG. 5 shows a flowchart of an illustrative process for estimating a similarity model, in accordance with some embodiments of the present disclosure.

FIG. 5 shows a flowchart for an illustrative process 500 for constructing a similarity model for a set of items from similarity evaluations of subsets of items. Process 500 may be executed to construct a similarity model for use in any suitable application. For instance, process 500 may be used to estimate a similarity model that may be used by system 100, for interactively placing orders, as described with reference to FIG. 1. In this case, process 500 may be executed by server 118 or any other suitable computer, and may be executed prior to user 110 connecting to server 118 to search for items using a search technique based at least in part on a similarity model.

Process 500 is an iterative process, initialized by determining relative similarity among multiple subsets of items. Based on these initial evaluations, an initial similarity model may be constructed as an embedding into a feature space—coordinates are assigned to each item in the set to preserve the relative similarity among them. Though, it should be appreciated that any suitable technique may be used to form an initial approximation of a similarity model, including, for example, assigning arbitrary or random similarity to items in the set.

Regardless of how the model is initialized, an iterative process may be used to refine the model based on similarity evaluations. At each iteration of process 500, more similarity evaluations of subsets of items may be obtained. These similarity evaluations may be used to both update estimated relative similarity among items and the associated embedding, leading to a more accurate similarity representation.

Process 500 begins in act 502 when a set consisting of N items is inputted. The number of items N may be any suitable positive integer and may be small or large. As previously mentioned, process 500 may be applied to learn a similarity model for any number of items, which in some embodiments may be tens, hundreds, thousands, or millions of items.

Next, an initial similarity model may be estimated in acts 504-506 of process 500. First, in act 504, a number of subsets of the N items are chosen. The subsets may be chosen at random from the N items. Though, the subsets may be chosen partially deterministically. For example, each item may be represented in at least one subset. The number of chosen subsets may be any suitable number and may be predetermined or automatically determined For example, the number of subsets may be predetermined to be a number between 1 and 1000 such as 5, 10, 25, 50 and/or 100. Though the number of subsets may be larger than 1000 and may also be set as a fraction (i.e., a percentage) of the number of items N. For instance, the number of subsets may be set to 1, 5, 10, 15, 20, and/or 25 percent of N.

In some embodiments, a fixed number of subsets may be chosen corresponding to each of the N inputted items. In this case, each of the subsets corresponding to an item contains that item. The number of fixed subsets corresponding to each of the N inputted items may be any suitable number between 1 and N, though preferably it would be a number smaller than N to limit the computational complexity of subsequent acts of process 500.

Each of the subsets chosen in act 504 of process 500 may comprise any suitable number of items. In some embodiments, each subset may consist of three items (a triplet). In other embodiments, each subset may consist of two items or four or five items. Still in other embodiments, not all subsets may consist of the same number of items.

Items in each subset may be chosen randomly from the N inputted items. Items may be chosen uniformly at random or according to any other suitable distribution. In addition, items may be chosen without replacement to avoid the appearance of duplicates of items in each subset. Though, in some embodiments items may be chosen with replacement and duplicates may be allowed. This may be done for diagnostic and quality control purposes as duplicated items may have the highest similarity.

In some embodiments, the order of items in the subset may matter. In particular, this order may have an effect on subsequent similarity evaluation of items in the subset. For example, evaluating the similarity of a subset consisting of three items by asking a user to decide whether the first item is more similar to the second or to the third item may depend on how the items are ordered. In other embodiments, the order may not impact subsequent similarity evaluation. For instance, evaluating the similarity of a subset consisting of two items by asking a user to rank how similar the two items are on a numerical scale may not depend on how the items are ordered.

Regardless of the number of subsets chosen, the manner in which they are chosen and the items these subsets contain, a similarity evaluation may be obtained for each of the chosen subsets in act 506 of the process 500. The similarity of each of the selected subsets may be evaluated by one or more human evaluators. For example, the similarity of items in each subset may be evaluated by a different user or multiple subsets may be evaluated by the same user. Also, multiple users may evaluate the similarity of items in the same subset. Users may be compensated or otherwise incentivized to perform similarity evaluations. Human evaluators may be identified, communicated with and compensated in any suitable way to obtain similarity evaluations, as the invention is not limited in this respect. To this end, any crowd-sourcing techniques known in the art may be employed. Obtaining user-performed similarity evaluations is described in more detail below with reference to FIG. 6. Alternatively, the similarity of some of the selected subsets may be automatically evaluated by a computer programmed to compute similarity evaluations. Still, another possibility is that the similarity of items in some selected subsets is evaluated by human evaluators and the similarity of items in other selected subsets is evaluated automatically by a computer.

An initial similarity model may be generated, in act 508, based on the obtained similarity evaluations of the subsets of items selected in act 504. To this end, values of the features for each item may be selected such that the resultant model, when used to compute similarity, produces values consistent with the obtained similarity evaluations. If a similarity model represents a set of items by assigning a d-dimensional coordinate to each item, as shown in FIG. 3, then an N by d matrix M of feature values may be computed from the obtained similarity evaluations. If a similarity model represents a set of items by an N×N similarity matrix K, as shown in FIG. 4, then its entries may be estimated from the obtained similarity evaluations. Though, in this latter case, the rank of the similarity matrix may be constrained to avoid solving an ill-posed inverse problem in which the number of feature values to estimate greatly exceeds the number of obtained similarity evaluations.

A variety of mathematical approaches to estimating a similarity model consistent with obtained similarity evaluations may be used. Feature values may be related to the observed data (i.e., the received similarity evaluations), for example via an equation, and the feature values may be estimated based on the relationship. For instance, a likelihood function of the model given the data may be defined and the similarity model may be obtained by maximizing the likelihood function given the observed data. Alternatively, the feature values may be treated as random variables and their estimation may be accomplished through Bayesian statistical methods such as maximum a posteriori estimation. Still another broad category of techniques comprises minimizing an empirical loss function of the estimated feature values.

In the case that evaluated subsets of items are triplets (A, B, C), one approach to estimating a similarity model for N items may proceed as described below. Let $p_{bc}^a$, denote the probability that a user rates item A as more similar to item B than to item C. These probabilities may be determined from the similarity evaluations. Accordingly, $p_{bc}^a + p_{cb}^a = 1$. Further, let $M_a$ denote the row of an N by d matrix M corresponding to coordinates of item A. As previously discussed, the number of columns d of the matrix M (dimensionality of coordinates assigned to each item) is not critical. Using a small number of dimensions may be computationally efficient, but using more dimensions may result in a similarity model that represents similarity among items more accurately at the expense of a greater amount of computation. Recall that matrix M may be used to obtain a similarity matrix K according to the equation $MM^T = K$. Thus, $K_{ab}$ denotes a similarity between items A and B when similarity is measured by an inner product between the coordinates of item A and item B. Thus, the matrix M or, equivalently, the similarity matrix K, may be estimated from a set of similarity evaluations.

One approach may be to minimize the empirical log loss of a model that predicts $p_{bc}^a$, for each evaluated triplet, subject to a suitable set of constraints introduced to reduce the number of degrees of freedom. The approach comprises minimizing the sum of the log losses for each of the similarity evaluations obtained in act 506 of the process 500. For instance, if it is determined in the i'th similarity evaluation that $A_i$ is more similar to $B_i$ than to $C_i$, the sum comprises the term $\log(\hat{p}_{b_i c_i}^{a_i})$, whereas if it is determined that A is more similar to B than to C, the sum comprises the term $\log(\hat{p}_{b_i c_i}^{a_i})$.

In the above equations $\hat{p}_{bc}^a$ denotes the predicted probability that a random user rates item A more similar to item B than to item C, according to a similarity model comprising a matrix M. Let $\delta_{ab} = \|M_a - M_b\|^2$ denote the squared distance between the coordinates associated with item A and item B. Then, the probability $\hat{p}_{bc}^a$ and M may be related via a proposal given by:

$$\hat{p}_{bc}^a = \frac{\mu + \delta_{ac}}{2\mu + \delta_{ab} + \delta_{bc}},$$

subject to the constraint that $K_{ii} = 1$ for all items for some positive real number $\mu$. This constraint may be interpreted as setting the similarity of each item to itself as 1. Though, the exact form of the proposal is not a limiting aspect of the present invention and other suitable proposals may be used.

Given the proposal, which may be viewed as a likelihood function, the similarity model parameters (i.e., the matrix M) may be estimated by minimizing the empirical log loss, described above, over all obtained similarity evaluations. This may be implemented using any of numerous numerical optimization techniques. For instance, gradient descent or stochastic gradient descent techniques may be employed. In some instances optimization may be performed on the matrix M, while in other cases (especially when d is large) the optimization may be performed on the similarity matrix K using a gradient projection descent approach. These approaches work well even though the loss function is not convex in K.

The above-described approach may be modified in a variety of ways. A different loss function may be used instead of log loss. For instance, any loss functions used in statistical decision theory and/or machine learning may be used, such as absolute loss, squared loss, 0-1 loss, and hinge loss, among others. As another example, a loss function that is a convex function of K may be used, such as a logistic function. In this case, the proposal may be given by $$\hat{p}_{bc}^a = \frac{1}{e^{K_{ac}} - e^{K_{ab}}}.$$

Many other proposals are known in the art of numerical computation methods. In this case, estimating the similarity model reduces to minimizing the empirical log loss of K over a convex set, which is a convex optimization problem. It should be appreciated that this approach may be easily adapted to work for subsets consisting of any number of items, not only those consisting of three items.

Regardless of how a similarity may be estimated in act 508, process 500 next proceeds to decision block 510, in which it is determined whether the similarity model may be updated. This determination may be made based on any suitable criteria. For instance, it may be determined that an initial similarity model should be updated at least once, but that no more than a fixed number of updates may be allowed due to the computational complexity of updating the model or obtaining new similarity evaluations. If it is determined in decision block 510 that the similarity model does not need to be updated, process 500 completes. The obtained similarity model may be stored or used in subsequent processing.

If it is determined that the similarity model should be updated, process 500 proceeds to act 512 during which another subset of items may be selected. The subset may be selected adaptively, from a set of candidate subsets, based on the similarity model and/or on at least some of all the previously obtained similarity evaluations. In some embodiments, the subset may be selected based on a relative degree of information gain for the candidate subsets. For instance, information gain may be computed for each candidate subset based on the current similarity model and a subset maximizing information gain may be selected. This and other approaches to adaptively selecting a subset are described in more detail below with respect to FIG. 7.

Next, in act 514, a similarity evaluation is obtained for the subset selected in act 512. The subset may be evaluated manually (e.g., by a human) or may be evaluated automatically. The evaluation may be done in the same way as for all prior evaluations. For instance, the similarity evaluation may be done in the same way as all the evaluations in act 506 of process 500. Though, in some embodiments, similarity evaluations in act 514 and 506 may be obtained differently. For instance, evaluations in act 506 may be automatically performed by a computer, while evaluations in act 514 may be human-performed similarity evaluations.

Regardless of how the subset selected in act 512 is evaluated in act 514, a new similarity model may be generated, in act 516, based on the new similarity evaluation, and the current similarity model or at least a subset of the previously-obtained similarity evaluations. This may be accomplished by using any of the approaches described with respect to act 508 of the process 508. In some cases, a new similarity model may be estimated directly from at least a portion of the previously-obtained similarity evaluations. Alternatively, the current similarity model may be updated based on the new similarity evaluation. For instance, a gradient descent algorithm may be used to iteratively update the coordinates representing items in the similarity model (e.g., the matrix M) in view of the new similarity evaluation.

After a new similarity model is obtained, either by updating or replacing the old similarity model, the process loops back to decision block 510. Acts 512-516 are repeated every time it is determined that the similarity model may be updated. Once it is determined that no further model updates are needed, process 500 ends. The similarity model obtained as a result of executing process 500 may be used for any suitable application. For instance, the obtained similarity model may be used to enable online shopping or any search website.

It should be appreciated that adaptively selecting subsets of items in act 512 may require a smaller number of iterations of acts 512-516 to estimate a similarity model to the same level of fidelity than by randomly selecting subsets. Some high-level intuition for the benefit of adaptive selection, in the case that selected subsets are triplets, is described below.

Consider a set of n items that naturally partitions into k<<n disjoint equal-sized clusters, such that items in different clusters are completely dissimilar, but items within each cluster have varying degrees of similarity. For example, product images from an online tie store may cluster into ties, tie clips, and scarves. Suppose that, within any specific cluster, one may identify an item of interest to a user using q queries by comparing the item to other items in the same cluster. On the other hand, suppose comparisons with items in two different clusters yield 50/50 random results if the items are in different clusters, but that the users will select an item in the same cluster if one exists in the comparison pair. The number of adaptive queries to learn in such a setting may be $\Theta(nk+nq)$ because $\Theta(k)$ comparisons may be used to determine (with high probability) which cluster each item is in and then an additional q queries may be needed. With random queries, one would require $\Theta(nqk^2)$ queries, because only a $1/k^2$ fraction of the random queries will count toward the q queries used to compare items within the same cluster.

Next, consider data representing an underlying rooted tree with k<<n leaves, inspired by, say, phylogenic trees involving animal species. Suppose the similarity between items is decreasing in their distance in the tree graph and, furthermore, that items are drawn uniformly at random from the clusters represented by the leaves of the tree. Regardless of how one would identify that two items are in the same leaf or subtree, it is clear that a non-adaptive method would have to ask $\Omega(nk)$ questions to determine the leaves to which n items belong (or at least to determine which items are in the same tree). On the other hand, an adaptive approach may determine such matters using fewer queries. In a balanced binary tree that may be O (n log k) queries, assuming a constant number of comparisons can determine to which subtree of a node an item belongs, which is an exponential savings over the non-adaptive approach.

Figure 6:
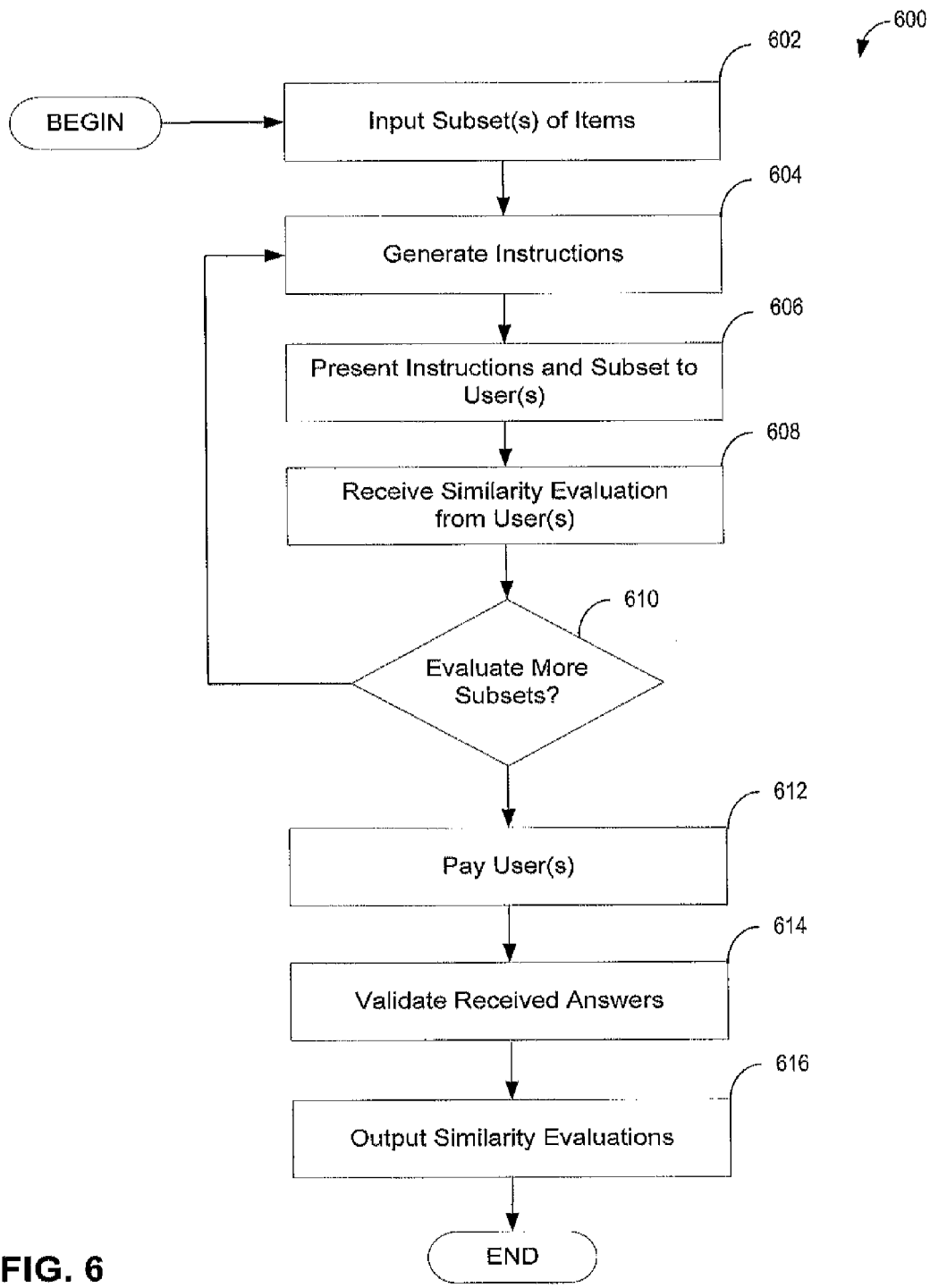
FIG. 6 shows a flowchart of an illustrative process for obtaining a similarity evaluation of one or more subsets of items, in accordance with some embodiments of the present disclosure.

FIG. 6 shows a flowchart of an illustrative process 600 for obtaining user-performed similarity evaluations of one or more subsets of items. Process 600 begins in act 602 with the input of at least one subset of items for subsequent similarity evaluation by one or more users. The subset(s) of items may have been selected for similarity evaluation in any suitable way (e.g., randomly or adaptively) and may have been selected either in act 504 or in act 512 of process 500.

Next, instructions may be generated for one subset among the inputted subsets, in act 604. Such instructions may indicate, to a user performing similarity evaluations, the type of similarity evaluation desired. For instance, an item in a subset may be identified as a designated item and the instructions may be: "Please indicate which of the items other than the designated item is most similar to the designated item." When each subset of items is a triplet, the first item may be identified as the designated item and the instructions may be in the form of a question: "Is the first item more similar to the second item than the third item?" In the case that each subset consists of two items the instructions may be: "Indicate, on a scale from 1 (least similar) to 10 (most similar), how similar the first item is to the second item."

Next, in act 606, the subset of items and the associated instructions may be presented to a user or multiple users. Items (e.g., images and text) and instructions (text) may be presented visually to a user on a screen of a display-enabled device (e.g., computer screen, PDA, tablet computer, etc.) and may be arranged on the screen in any suitable way. Alternatively, items (e.g., audio clips) and instructions (e.g., synthesized speech from text instructions) may be presented audibly using a device capable of outputting audio (e.g., speakers connected to a computer).

A user may be located remotely from the system on which process 600 may be executing and, in a case when multiple users evaluate similarity of subsets the users may be located in different places from one another. Process 600 may coordinate obtaining similarity evaluations from users via crowd-sourcing techniques as are known in the art. For example, a web-based collaboration platform or crowd-sourcing platform may be utilized. To this end, the system may send the subset of items and associated instructions to other computers that users may access. For instance, the system may include a web-server hosting a website or communicate with an external web server to present the subset of items and associated instructions to users via a web-based interface. A particular user may access this information by using a web-browser to perform a similarity evaluation of the items. Many alternatives will be apparent to those of skill in the art. Note that a user need not provide a similarity evaluation for a subset at the exact time that the system identifies that such an evaluation is necessary. Rather a user may access subsets at a convenient later time to perform similarity evaluations.

Regardless of how the subset of items and instructions may be presented to a particular user, and the time at which that user may perform the similarity evaluation, process 600 proceeds to act 608 in which an indication of the similarity evaluation is received from at least one user. For instance, a user may have indicated that item A is more similar to item B than item C, and an indication of this selection may be received.

Next, process 600 continues to decision block 610 in which it is determined whether there are any additional subsets of items for which to obtain a similarity evaluation. If it is determined that there are more subsets of items to evaluate, the process loops back to act 604, and acts 604, 606, and 608 are repeated for each subset of items for which a similarity evaluation has yet to be obtained.

Any suitable stopping criteria may be used, in decision block 610, to determine whether additional subsets of items may need to be evaluated by a user. For example, a fixed number of subsets may need to be evaluated. Alternatively, the number of subsets to be evaluated may be dynamically determined. In one embodiment, when a similarity evaluation for each additional subset may be used to update a similarity model (as described with reference to FIG. 5), the similarity model may be used to determine whether a similarity evaluation for another subset is needed. For instance, it may be determined that no additional subset evaluations are necessary if it is determined that a previously-obtained similarity evaluation for a subset did not substantially change the coordinates of one or more items, after the similarity model was updated.

If it is determined, in act 610, that no subsets remain for evaluation, a user may be paid for performing similarity evaluations in act 612. For instance, a user may be paid 15 cents for each similarity evaluation or for each set of similarity evaluations the user has performed. Though, how the user is paid and what amount the user is paid per similarity evaluation is not a limiting aspect of the present invention.

Similarity rankings received from a user may be validated in act 614. Outliers (e.g., random responses or purposefully misleading responses) may be filtered out. To enable detection of such poor responses, validation subsets of items may be sent to the user for similarity evaluation. For example, a validation subset may comprise two identical items and an "obviously" different item (e.g., two pictures of the same necktie and a picture of a skydiving dog). If a user were to judge the dog as more similar to a necktie than the second and identical necktie, the resulting evaluation may indicate that other similarity evaluations by the user may not be trustworthy. Any similarity evaluations deemed outliers may not be reported.

Next, all valid similarity evaluations, as verified in act 614, may be output in act 616, after which process 600 completes. Similarity evaluations may be stored for subsequent use or used right away. For example, similarity evaluations obtained by executing process 600 may be used to generate or update a similarity model as described with respect to FIG. 5.

Various modifications of process 600 are possible. The process may be adapted to obtain similarity evaluations from multiple users and may operate to allocate similarity evaluation tasks to each user. In some embodiments, the order of acts of process 600 may be different. For example, acts 604, 606, and 608 may be executed in parallel rather than sequentially so that similarity evaluations may be sent out and received in any suitable order.

Subsets chosen for similarity evaluation, as part of processes 500 and 600, may be chosen in any suitable way. In some embodiments, they may be chosen adaptively based on already-obtained similarity evaluations and/or based on a similarity model. The adaptive selection may rely on an information gain criterion.

In some embodiments, subsets of items may be selected to first facilitate grouping items into clusters. This selection may be based on probability or certainty related to the clustering of items, with items for which there is least certainty of similarity to any identified cluster being preferentially selected over items that are associated with a cluster with a higher degree of certainty. By using similarity evaluations to increase the certainty with which such an item is associated with a cluster, a relatively large amount of information may be gained. For example, a high degree of information may be obtained by selecting for evaluation an item that seems equally similar to items in two clusters. An evaluation may involve comparison of that item to an item in each of the clusters.

Once items are grouped into clusters with a high degree of certainty, more useful information may be obtained by performing similarity evaluations among items in a cluster. In this scenario, comparing an item, indicated to be in one cluster, with a high degree of certainty to items in a different cluster is unlikely to yield meaningful new information. Rather more information is likely to be obtained by a similarity evaluation among items already associated with a cluster. Accordingly, as information about the relative similarity of items is generated, it may be used in subsequent iterations to select items for comparison based amount of information likely to be obtained.

Figure 7:
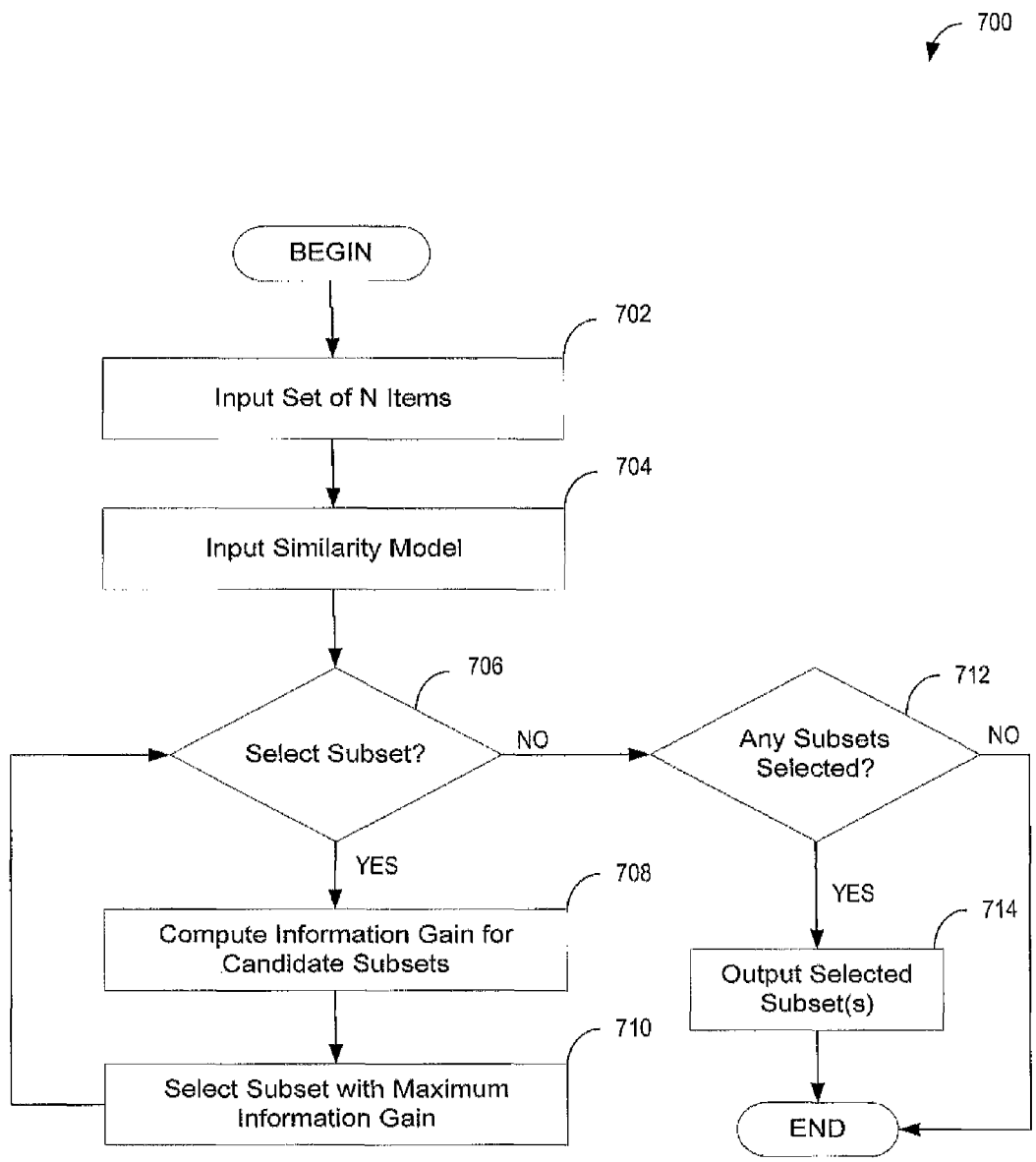
FIG. 7 shows a flowchart of an illustrative process for adaptively selecting one or more subsets of items for similarity evaluation, in accordance with some embodiments of the present disclosure.

FIG. 7 shows a flowchart for an illustrative process 700 for adaptively selecting one or more subsets of items for subsequent similarity evaluation by one or more users. Process 700 may be used as part of a process for building a similarity model and may be used, for example, to implement at least a portion of act 512 of process 500.

Process 700 begins when a set of items and a similarity model indicative of a degree of similarity among the items are inputted in acts 702 and 704, respectively. The similarity model may be any suitable similarity model and may be, for instance, a similarity model that associates coordinates with each item in the set (an embedding). Additionally or alternatively, the similarity model may represent characteristics simultaneously associated with more than one item in a set of items. For example, the model may represent similarity via a similarity matrix.

Next, it may be determined, in decision block 706, whether a subset of items may be adaptively selected. For example, it may be determined in act 510 of process 500 that the similarity model may be updated and that a subset of items needs to be selected in act 512.

If it is determined that a subset may be selected, a subset may be adaptively selected in any of numerous ways. For example, adaptive selection may be based on already-obtained similarity evaluations of other subsets and/or it may be based on accessing the similarity model inputted in act 704. Adaptively selecting a subset may comprise evaluating candidate subsets according to any suitable criteria and selecting one of the candidate subsets. Criteria may be formal and, for example, may be based on geometric, statistical or information-theoretic measures or may be heuristic.

In some embodiments, adaptively selecting a subset may comprise selecting a subset based on an amount of information revealed/gained by a selection of an item in the subset. The similarity model inputted in act 704 of process 700 may be used to compute an estimate of the amount of information gain. A similarity evaluation of such a subset may be used to obtain information concerning items about whose similarity to other items the similarity model may have the greatest degree of uncertainty relative to locations of other items. For example, reducing uncertainty about the location of one item that is near other items may reveal more information than reducing uncertainty about the location of another item, which is far away from other items. In the example shown in FIG. 2b, for instance, reducing uncertainty about the location of item 218, which is within distance $D_1$ of item 216, may reveal more information than reducing uncertainty about the location of item 214 which is not near any other item.

Additionally or alternatively, computing an amount of information gain may involve using the similarity model to predict the outcome of human similarity evaluations associated with each possible subset selection. Each such prediction may have a different degree of certainty. Selecting low-certainty subsets for subsequent evaluation may provide the most information about similarity characteristics that the model may not adequately represent. In turn, similarity evaluations of such subsets may be used to update the similarity model (e.g., in accordance with process 500). This approach may allow for a similarity model to be learned using a fewer number of evaluations than when an approach based on random subset selection is employed.

For example, a similarity model for a set of items may be generated based on an initial set of human similarity evaluations. The similarity model may be used to predict with certainty above one threshold that humans may perceive items in a first subset of items as being more similar to one another than to items in a second subset of items and/or that humans may perceive items in the second subset as more similar to one another than to items in the first subset. However, the similarity model may have certainty below another threshold about whether humans may perceive items in a third subset of items are more similar to items in the first subset or items in the second subset. Accordingly, evaluating a triplet of items comprising an item from each of the first, second and third subsets may be more informative than evaluating a triplet comprising items only from the first and second subsets. The resultant evaluation may be used to update the similarity model. Note that the two thresholds may be the same threshold or may be different thresholds.

As a specific example, suppose that a similarity model for images of neckties is generated based on an initial set human similarity evaluations for image triplets. Such a model may, for instance, be used by system 100 to enable a user to interactively search for a tie. The similarity model may be used to predict that humans perceive striped ties as being more similar to one another than to solid ties and/or that humans perceive solid ties as being more similar to one another than to striped ties, but may have certainty below a threshold about whether a checkered pattern may be perceived by people as being more similar to striped ties or to solid ties. Accordingly, evaluating a triplet of images associated with a striped tie, a checkered tie, and a solid tie may be more informative than evaluating a triplet containing images only of striped and solid ties.

The above-described idea for selecting the most informative subset may be realized in any of numerous ways. For instance, an information-theoretic or a statistical function may be used to provide a quantitative measure of how informative each candidate subset may be relative to the similarity model input in act 702.

Suppose that previously-obtained similarity evaluations of triplets, each containing item A, indicate that item A is more similar to item $B_i$ than to item $C_i$ for i=1, 2, . . . , j−1. The goal is to adaptively select the most informative triplet of the form $(A, B_j, C_j)$ based on these evaluations.

The previously-obtained similarity evaluations may be used to generate a posterior distribution of $$\rho(x) \propto \pi(x) \prod_i \hat{p}_{b_i c_i}^x$$

over the d-dimensional vector x, which represents coordinates associated with item A. The quantity $\hat{p}_{b_i c_i}^x$ may be obtained in any suitable way. For example, it may be computed from the similarity model as previously discussed with reference to FIG. 5. The prior distribution $\pi$ may be the uniform distribution over the set of points in M. Another prior distribution that may be suitable is a multinomial distribution fit to the data in M. Still other prior distributions may be induced by placing appropriate priors on K such as a Wishart distribution on the space of positive definite matrices.

Given any candidate subset of items (A, B, C), the similarity model may predict that a user may rate item A as more similar to B than C with probability $$p \propto \int_x \frac{\delta(x, c)}{\delta(x, b) + \delta(x, c)} \rho(x) dx.$$

If, upon being presented with this candidate subset, a user were to rate A as more similar to B than C, then x would have the posterior distribution of $$\rho_b(x) \propto \rho(x) \frac{\delta(x, c)}{\delta(x, b) + \delta(x, c)},$$

and $\rho_c(x)$ (of similar form) otherwise.

The information gain of the query (A, B, C) may be defined to be $H(\rho) - pH(\rho_b) - (1-p)H(\rho_a)$, where H is the entropy of a distribution. This is equal to the mutual information between the user's selection and x. The most informative subset may be selected as the subset (A, B, C), for all pairs B, C, which maximizes information gain. Though it should be recognized that any of numerous other information-theoretic functions, other than information gain, may be used to identify the subset to select, including relative entropy, Renyi entropy, Kullback-Liebler divergence and others. Other functions of the distributions $\rho$, $\rho_a$ and/or $\rho_b$ that may be used include functions of moments, cumulants, and likelihoods, though any suitable function of the distribution may be used.

Accordingly, in act 708, information gain (or any other suitable measure) may be evaluated for each of candidate subsets. In some cases, all possible candidates may be considered. Though, in other cases there may be a large number of candidate subsets (e.g., $O(N^3)$ triplets) to consider, and a subset may be selected from some but not all of possible candidate subsets.

A subset of items may be chosen based on the evaluation of the information gain criterion for each of candidate subsets performed in act 708. For instance, the subset with maximum information gain may be selected in act 712 of process 700. Though, in some cases another subset may be selected based on the evaluation such as any subset among a number (e.g., three, five, ten, and etc.) of subsets with the largest information gain. Regardless of which subset of items is selected in act 710, process 700 loops back to decision block 706.

If it determined in decision block 706 that no more subsets need to be selected, process 700 proceeds to decision block 712. If it is determined that no subsets were selected, process 700 completes. On the other hand, if at least one subset was selected, the selected subset(s) are output in act 714 and process 700 completes. The selected subset may then be presented to a user so that the user may evaluate the similarity of items in the selected subsets, for instance, as described with reference to FIG. 6. In turn, the similarity evaluation may be used to update the similarity model.

Figure 8A:
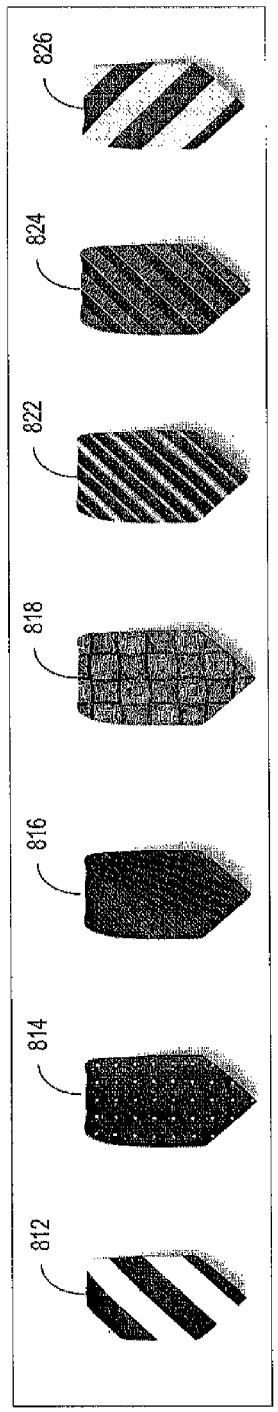
FIG. 8a shows an illustrative set of images showing products that a user may browse, in accordance with some embodiments of the present disclosure.

In addition to using information gain to adaptively learn a similarity model, information gain may be applied to the problem of searching. For instance, it may be used to help a user search for a product that the user may wish to buy. FIG. 8a shows an illustrative set of products that a user may search and/or browse. In this specific example, each product shown in FIG. 8a is a tie and is represented by an image. The shown ties may be in a portion of a set of all the ties that a user may browse, though, for simplicity, only seven ties are shown. Specifically, FIG. 8a shows four striped ties (812, 822, 824, and 826), a dotted tie 814, a solid tie 816, and a patterned tie 818. It should be recognized that the shown ties are merely illustrative. In practice, a user may browse any suitable set of products that may or may not include ties. It should be appreciated that users searching for products are typically not also the users previously described as performing similarity evaluations. Though, in some instances, a user searching for a product may have previously performed a similarity evaluation.

The user may browse the ties shown in FIG. 8a using any suitable system that may support interactive search. In addition, the user may use the system to place an order for one of the ties (or any product in the general case). For example, the user may browse the ties using system 100 discussed with reference to FIG. 1. In this case, the user may be user 110 and may browse and select items by using application 115 running on mobile device 112. The user may be a user that has not previously provided any similarity evaluations (e.g., for constructing a similarity model that may be used my system 100), though in some instances the user may be one of the one or more users that provided similarity evaluations.

Figure 8C:
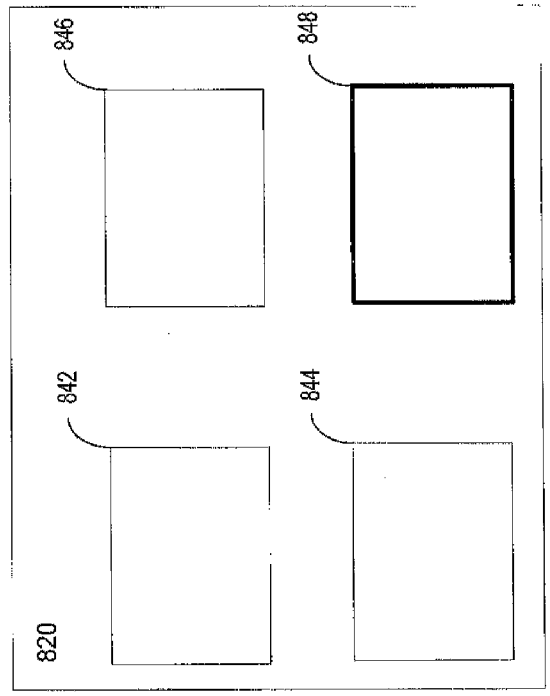
FIGS. 8b and 8c show an illustrative user interface of an exemplary system for receiving orders corresponding to products shown in FIG. 8a, in accordance with some embodiments of the present disclosure.
Figure 8B:
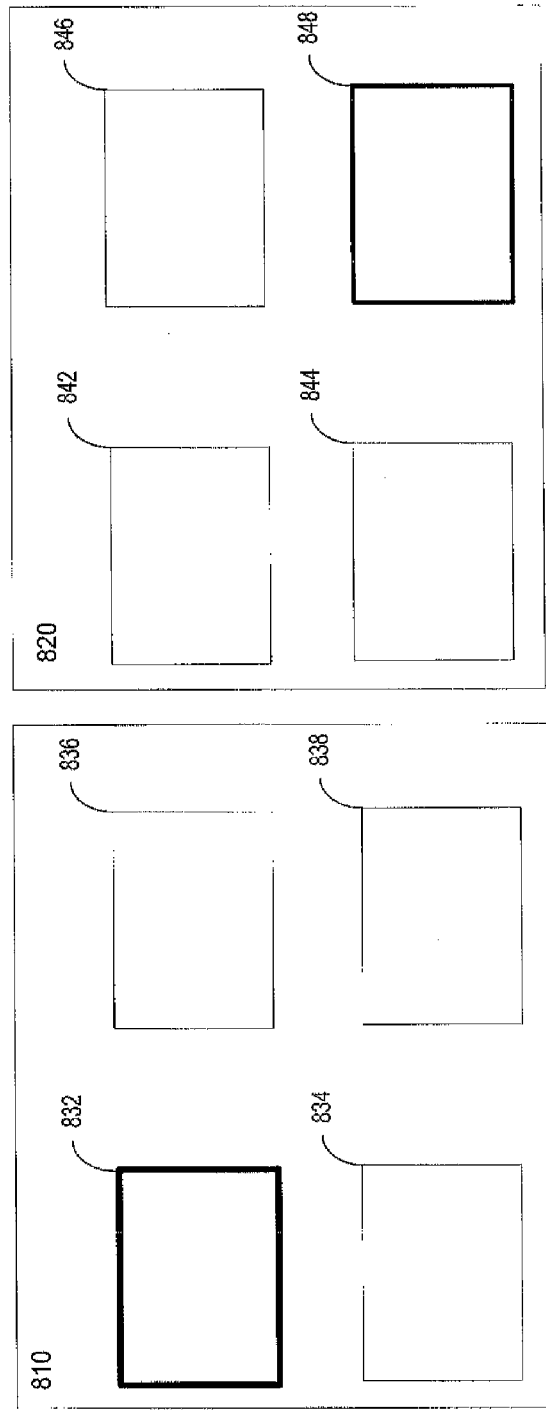

FIGS. 8b and 8c show, schematically, an illustrative user interface for allowing users to browse products and for receiving user-specified orders for products, such as the products shown in FIG. 8a. The user interface may be implemented in any suitable way. For instance, it may be implemented as a stand-alone application, a mobile application (e.g., application 115), a web-based application, or a series of web pages accessible by an Internet browser. Though, the user interface may be implemented in any other suitable way, as the invention is not limited in this respect.

FIG. 8b illustrates an example view that may be presented to user 110 who may be searching for a tie. The system may present an initial set of ties to the user in response to an indication from the user that the user may be interested in ties. The indication may be any type of indication and may be provided by the user in any suitable way as the invention is not limited in this respect. The initial set of ties is shown in panel 810—striped tie 832, dotted tie 834, solid tie 836, and patterned tie 838. These ties may correspond to ties 812, 814, 816, and 818 shown in FIG. 8a or they may be different ties. Images associated with these ties may be ordered and/or arranged in any suitable way on panel 810 and are not limited to the particular arrangement (i.e. rows and columns) as shown in FIG. 8b. Panel 810 may be displayed on a display-capable device such as mobile device 812.

User 110 may select one of the presented ties. The user may select the tie to browse other ties similar to the tie or may select the tie to purchase it. In the illustrative example of FIG. 8b, user 110 selects striped tie 832 to browse for similar ties—the outline of the corresponding image is highlighted with a darker border. In response to this selection, system 100 may select another subset of ties to present to user 110 based on a similarity model. For instance, the subset of ties may be selected to better discriminate what tie the user is looking for. Additionally or alternatively, the subset of ties may be selected to find ties most similar to the selected tie. In this case, the second subset of selected ties may be similar to characteristics derived from the selected ties. In this illustrative example, the second subset of selected ties is shown in panel 820 (ties 842, 844, 846, 848) and each of the selected ties is a striped tie. For instance, ties 842, 844, 846, and 848 may correspond to ties 812, 822, 824, and 826 shown in FIG. 8a. Though, the ties shown in panel 820 may correspond to any striped tie. In accordance with some embodiments, the subset of items (e.g., ties or any other suitable items) may be selected based on information gain from a user indication of an item in the subset as being most similar to an item of interest to the user. Accordingly, each selection of a new subset is analogous to a similarity evaluation as described above. A similarity model may be used to compute an information gain from a selection from a subset, as described above. Accordingly, techniques, as described above, may be used to iteratively select subsets of items to present to a user. Each iteration will generate information indicating characterization, within the similarity model, of the item of interest. This updated characterization can then be used in subsequent iterations to identify subsets based on information gain.

After being presented with screen 820, user 110 may select another tie—in this example tie 826 is selected—and either continue browsing similar ties and/or purchase the selected tie. The above-outlined process is described in greater detail below with reference to FIG. 9. It should be appreciated that the user interface described with reference to FIGS. 8*a*, 8*b*, or 8*c* is illustrative and any suitable user interface may be used as the invention is not limited in this respect.

Figure 9:
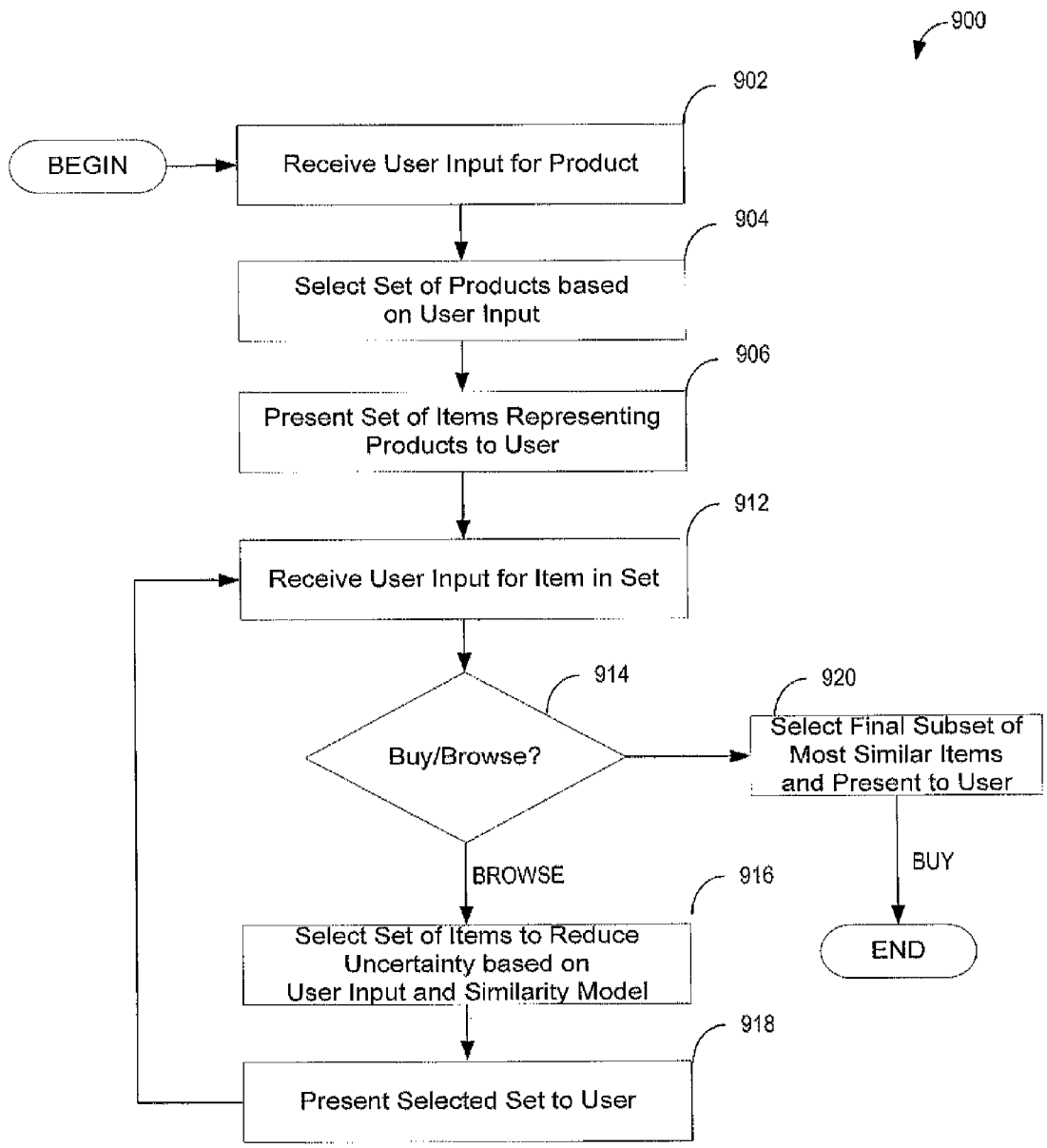
FIG. 9 shows a flowchart of an illustrative process for browsing and selecting products, in accordance with some embodiments of the present disclosure.

FIG. 9 shows a flowchart of an illustrative process 900 for interactively searching for items by a series of successive refinements and will be detailed below. Process 900 may be applied in a broad variety of settings and, for example, may allow a user (e.g., user 110) to search for a product, such as a necktie, in an online store. In this case, process 900 may be executed by online store server 118 described with respect to system 100, and may enable server 118 to receive orders for items. Though, it should be recognized that process 900 may be executed by any system that supports receiving orders and/or interactive browsing/search for items.

Process 900 comprises two phases. In the first phase a similarity model may be used to quickly learn characteristics of an item of interest to the user. Subsets of items may be selected based on the amount of information gained from a subsequent selection from each such subset. In the second phase, the learned characteristics of the item may be used to select a final subset of items having characteristics similar to the learned characteristics for a final user selection.

Process 900 begins in act 902 when input from a user indicating a request for a product is received. The product may be any suitable product that may be purchased or otherwise obtained or even about which information is to be provided. For example, it may be any product (e.g., a tie, a vacuum cleaner, or galoshes) sold at a store or offered on the website of an online store. A product may be an audio recording such as music or a sound effect. A product may also comprise text information. For instance, it may comprise a set of words or phrases (e.g., a quotation, a name, and song lyrics).

The received request may be of any suitable form. For instance, the request may comprise a search query inputted into an Internet search engine or a domain-specific search engine configured to search products sold at an online store. A request may also be indicated by a mouse click selecting a link to a type of product or an image of a product. In the context of system 100, user 110 for example may use application 115 to browse to website of the online store and type in a query "ties," click on a link labeled "ties," and/or click on an image of a tie. Though, many other ways of indicating a product request may be used as the invention is not limited in this respect.

A set of products may be selected in response to the received request, in act 904. For example, if the received request indicates that a user is interested in neckties, server 118 may select a set of ties to present to the user. The set of products selected in act 904 may be selected using any suitable criteria from any suitable source, such as from a store database, an external database, and/or the Internet. Products may be selected based on one or more product characteristics. For example, a set of ties with diverse characteristics may be selected and presented to the user (e.g., striped, dotted, and solid). Additionally or alternatively, the selected ties may be the most popular ties, the cheapest ties, the most expensive ties, the ties with the highest or lowest customer rankings and so forth. The precise way in which the set of products is selected, in act 904, is not a limiting aspect of the invention.

Regardless of how the set of products is selected, items associated with selected products may be presented to the user (e.g., user 110) in act 906. The format in which items are presented is not critical. In some embodiments, images depicting the products may be shown to the user. For example, images may be organized on a webpage and displayed to a user on a screen of a display-enabled device (e.g., mobile device 112). The images may be arranged for presentation in any suitable manner For instance, images may be symmetrically arranged as shown on display screen 810 of application 115 described with reference to FIG. 8*b* or in any other suitable way. Though in other embodiments, items may be presented to a user differently. For instance, they may be audibly presented (in the case that items are audio recordings), or displayed as text.

In response to being presented with a set of items, the user may provide input with respect to one of the presented items, in act 912. The input may indicate a selection of a particular item and/or an indication of whether the user wishes to continue browsing for items related to the selected item or to buy a product related to the selected item. The format of the user input may be any suitable format and is not a limiting aspect of the present invention. After user is received in act 912, process 900 continues to decision block 914.

In decision block 914 it may be determined whether the user input, received in act 912, indicates that the user wishes to buy a product associated with one of the presented items or whether the input indicates that the user wishes to change the mode with which the user is interacting with the system. Such input may indicate that the user wishes to continue providing input, better defining an item of interest, or to see items similar to one of the presented items. If it is determined that the user wishes see similar items, for example to buy a product associated with one of the similar items, process 900 continues to act 920 during which a final set of items similar to the selected item may be presented to the user. The final set of items may be obtained based on the similarity model and the selected item. The user may select one of the items in the final set and indicate that he wishes to purchase this item. The process 900 then completes.

On the other hand, if it is determined, in act 914, that the user wishes to continue browsing and allowing the system to gain more input for positioning an item of interest with respect to a similarity model for the set of items, another set of items may be selected in act 916 of process 900 and presented to the user in act 918 of process 900. The set of items selected in act 916 may be selected to quickly identify an item of interest to the user, so that a set of items similar to the item of interest to the user may be presented for a final selection. For example, the set of items may be selected by using a similarity model in combination with the specific item selected in act 912 to identify coordinates of an item of interest within a similarity model.

It should be appreciated that an item of interest to a user may be a particular item in the set of items browsed by the user. For instance, it may be a product such as a tie sold by a store. In such cases, finding the item of interest may amount to browsing for and locating the item. Alternatively, the item of interest may not correspond to any item in the set of items browsed by the user, such as a particular product sold by a store. For instance, the user may have only a vague notion of what he is looking for or he may be looking for something concrete (e.g., yellow polka-dot tie with black stripes), but that item may not be sold by the store. In this case, the item of interest may be a "phantom" item—and locating the phantom item may involve maximizing information and/or minimizing uncertainty about the coordinates of the phantom item as it would be represented in a similarity model if it were actually in the set of items.

The selection of items in act 916 may be based on a similarity model that may represent characteristics of items associated with products that a user may be browsing and/or buying such that the represented characteristics are indicative of a degree of similarity among the items. The similarity model may be any suitable similarity model and may be a similarity model that associates coordinates to each item (e.g., as described with reference to FIGS. 2a-2c, and 3) and/or may represent similarity by a similarity kernel (e.g., as described with reference to FIG. 4). The similarity model may be constructed in any suitable way. For example, the similarity model may be constructed in accordance with processes illustrated in FIGS. 5-7, or by any suitable modification thereof. In some embodiments, the similarity model may be constructed prior to the user starting to browse for items. For instance, the online store server or a server operated by any other entity may be operated to estimate a similarity model for a set of items corresponding to products sold by the store.

Additionally, the similarity model may be updated based on browsing operations of users as they may be interactively searching for products. For example, in the example discussed with respect to FIG. 8, when a user selects tie 826 from a subset containing ties 812, 822, and 826, the system may infer that user judges tie 812 to be more similar to tie 826 than to tie 822 or 824. As a specific example, data on prior user purchases may be used to update the similarity model for subsequent users visiting the store website. In such an embodiment, each such purchasing session may be treated as a series of similarity evaluations with the item eventually purchased being compared to at least one item in at least one of the subsets of items displayed to the user leading up to selection of the purchased item. These similarity evaluations may be used as described above to refine the similarity model. Though, many others ways of updating a similarity model based a browsing user history may be apparent to those skilled in the art. For instance, if one or more users requires many clicks to interactively search for and locate an item of interest, it may be determined that the similarity model may not represent a human notion of similarity sufficiently well. In this case, additional user evaluations of similarity (e.g., in accordance with process 600) among the items may be obtained and the similarity model may be re-estimated.

In act 916, the set of items may be selected by any of numerous selection procedures. For example, an adaptive selection procedure may be used and may be a procedure similar to the adaptive procedure described with reference to FIG. 7. For example, the adaptive selection procedure may comprise evaluating an information-theoretic measure (e.g., information gain, KL divergence or any other suitable measure) for one or more candidate subsets each of which comprises the item indicated by the user input received in act 912. In this case, the set of items selected in act 916 may comprise items contained in subsets determined to be most informative relative to the similarity model. Accordingly, the set of items is adaptively selected because the selection of constituent items depends on the last item selected and on the similarity model.

In other embodiments, the set of items may be selected using any suitable heuristic measure. For instance, the similarity model may be used to select a set of items most similar to the selected item. This information may be obtained from a similarity matrix and/or from a set of coordinates associated with the items represented by the model and any distance function. Still in other embodiments, items may be selected at random.

Regardless of how the items are selected or which items are selected, in act 916, the selected subset of items is presented to the user in act 918. The items may be presented in any suitable way. For instance, they may be presented in the same way as in act 906 of process 900. For instance, images may be symmetrically arranged as shown on display screen 820 of application 115 described with reference to FIG. 8c or in any other suitable way. In essence, the user has been presented a refined set of items based on his previous selection.

After selected items are presented to the user, process 900 loops back to act 912 to receive user input. If it is determined, in decision block 914, the user wishes to continue browsing, acts 916, 918, and 912 are repeated. If, on the other hand, it is determined that the user wishes to purchase a product related to an item in the list of presented items process 900 proceeds to act 920.

Though application of similarity models to the problem of interactive search (i.e., browsing a set of items through a series of successive refinements) was discussed herein, it should be recognized that similarity models may be applied to a broad variety of other problems. For example, similarity models may be applied to the problem of classification—a similarity kernel may be used as part of a linear classifier such as a support vector machine. In the context of supervised learning, for example, this may help to elucidate which features have been used by humans in labeling the data. Examples of other applications include detection, collaborative filtering, and clustering.

Figure 10:
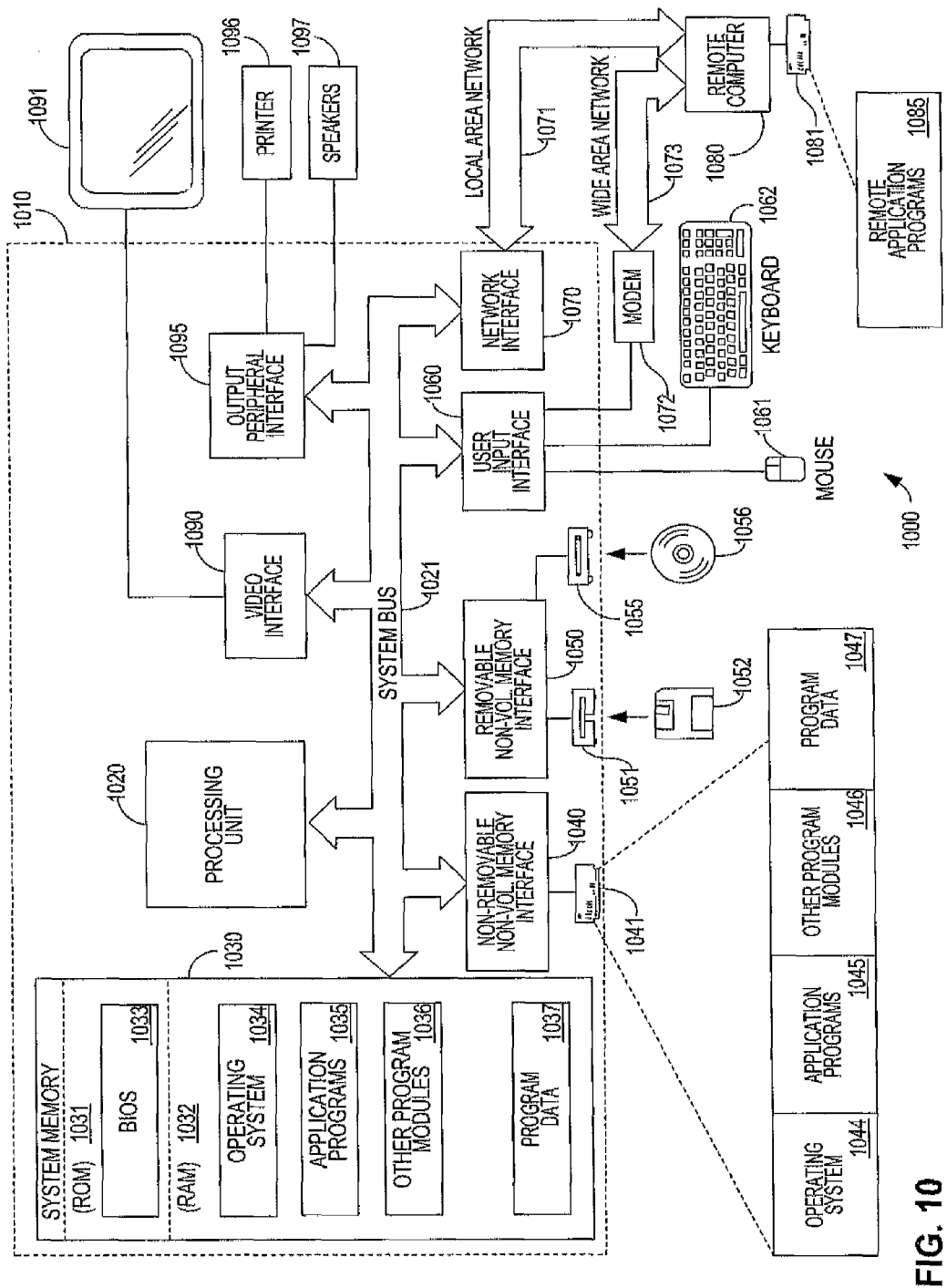
FIG. 10 is a block diagram generally illustrating an example of a computer system that may be used in implementing aspects of the present disclosure.

Regardless of the particular application of similarity models, various aspects of applying similarity models may be implemented using a computing system environment such as the exemplary computing system environment illustrated in FIG. 10. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for computing a representation of similarity among items in a set of items, the method comprising:
generating a first similarity model that represents characteristics of the set of items, the characteristics being indicative of similarity among the items in the set of items;
with a processor, adaptively selecting a subset of the set of items for similarity evaluation based on the first similarity model;
presenting the adaptively-selected subset of items to one or more users for similarity evaluation;
receiving one or more similarity evaluations from the one or more users for the adaptively-selected subset of items;
validating the received similarity evaluations by presenting to the one or more users a validation subset of items for a validation similarity evaluation and determining whether the received similarity evaluations for the adaptively-selected subset of items are trustworthy based on results from the validation similarity evaluation;
filtering out outlier similarity evaluations based on the validation similarity evaluation results;
generating a second similarity model based on the first similarity model and the one or more validated similarity evaluations; and
selecting a set of products to present to at least one of the one or more users based on the second similarity model.

2. The method of claim 1, wherein:
the method further comprises presenting the adaptively-selected subset to the user; and
receiving the similarity evaluation comprises asking the user to evaluate the similarity items in the adaptively-selected subset.

3. The method of claim 2, wherein asking the user to evaluate the similarity of items in the adaptively-selected subset comprises asking the user to indicate, for a designated item in the subset, which of the other items in the subset is most similar to the designated item.

4. The method of claim 2, wherein:
the subset consists of three items; and
asking the user to evaluate the similarity of items in the adaptively-selected subset comprises asking the user to indicate, for a designated item in the subset, which of the other items in the subset is most similar to the designated item.

5. The method of claim 1, wherein adaptively selecting comprises:
evaluating an information-theoretic function for each of a plurality of candidate subsets of the set of items based on the first similarity model; and
selecting a candidate subset from the plurality of candidate subsets based on the evaluations of the information-theoretic function.

6. The method of claim 1, wherein adaptively selecting comprises:
computing information gain for each of a plurality of candidate subsets based on the first similarity model; and
selecting a candidate subset based on a relative degree of information gain for the plurality of candidate subsets.

7. The method of claim 1, wherein generating the first similarity model comprises:
selecting a plurality of subsets of the set of items;
receiving a similarity evaluation for each subset in the plurality of subsets; and
estimating the first similarity model from the received similarity evaluations.

8. The method of claim 1, wherein the similarity model represents characteristics of items in the set of items by a measure of similarity between a designated item in the set of items and each item in the set of items.

9. The method of claim 8, wherein the similarity model represents similarity via a positive semi-definite matrix storing a similarity measure corresponding to every pair of items.

10. The method of claim 1, wherein the items in the set comprise images.

11. A system for computing similarities between images in a set of images, the system comprising at least one processor programmed to perform a method comprising:
receiving a first set of similarity evaluations from one or more users, wherein each similarity evaluation is an evaluation of a subset of the set of images;
adaptively selecting an additional subset of the set of images for similarity evaluation based on the first set of similarity evaluations and an information-theoretic criterion;
receiving one or more additional similarity evaluations for the additional subset from the one or more users;
validating the similarity evaluations by presenting to the one or more users a validation subset of items for a validation similarity evaluation and determining whether the received similarity evaluations are trustworthy based on results from the validation similarity evaluation;
filtering out outlier similarity evaluations based on the validation similarity evaluation results;
with at least one processor, generating a similarity model based on the validated similarity evaluations; and
presenting a set of products to at least one of the one or more users based on the generated similarity model.

12. The system of claim 11, wherein:
the method further comprises presenting the additional subset to the user; and
receiving the additional similarity evaluation comprises asking the user to evaluate similarity of images in the additional subset.

13. The system of claim 12, wherein presenting the additional subset to the user comprises displaying images in the additional subset to the user via a web-based interface.

14. The system of claim 11, wherein:
the subset consists of three images; and
asking the user to evaluate the similarity of the adaptively-selected subset comprises asking the user to indicate, for a designated item in the subset, which of the other items in the subset is most similar to the designated item.

15. The system of claim 11, wherein the method further comprises paying the user to evaluate the similarity of the additional subset.

16. The system of claim 11, wherein generating the second similarity model further comprises:
estimating the second similarity model based on a loss function.

17. The system of claim 16, wherein the loss function is one of empirical log loss, hinge loss, 0-1 loss, squared error loss, and absolute error loss.

18. A computer-readable storage medium encoded with processor-executable instructions that, when executed by a processor, cause the processor to perform a method for computing similarities among items in a set of items, wherein each of the items in the set is represented quantitatively by coordinates in a first set of coordinates, the method comprising:

selecting a subset of the set of items for similarity evaluation based on the first set of coordinates;

receiving one or more similarity evaluations for the selected subset of items from one or more users;

validating the received similarity evaluations by presenting to the one or more users a validation subset of items for a validation similarity evaluation and determining whether the received similarity evaluations for the selected subset of items are trustworthy based on results from the validation similarity evaluation;

filtering out outlier similarity evaluations based on the validation similarity evaluation results;

computing a second set of coordinates based on the first set of coordinates and the validated similarity evaluations, wherein each of the items in the set is represented quantitatively by a coordinate in the second set of coordinates; and selecting a set of products to present to at least one of the one or more users based on the validated similarity evaluations.

19. The computer-readable storage medium of claim 18, wherein:

selecting the subset comprises:

computing information gain for each of a plurality of candidate subsets based on the first set of coordinates; and selecting a candidate subset based on relative information gain from receiving a similarity evaluation of each of the plurality of candidate subsets.

20. The computer-readable storage medium of claim 19, wherein computing information gain for a candidate subset comprises:

generating a probability distribution to capture uncertainty about item coordinates associated with an item in the candidate subset, wherein the first set of coordinates comprises the item coordinates; and computing entropy of the probability distribution.

\* \* \* \* \*